United States Patent [19]
Gupta et al.

[11] Patent Number: 5,914,174
[45] Date of Patent: Jun. 22, 1999

[54] LENS OR SEMI-FINISHED BLANK COMPRISING PHOTOCHROMIC RESIN COMPOSITIONS

[75] Inventors: Amitava Gupta, Bethesda, Md.; Ronald D. Blum, Roanoke, Va.; William Kokonaski, Roanoke, Va.; Venkatramani S. Iyer, Roanoke, Va.

[73] Assignee: Innotech, Inc., Roanoke, Va.

[21] Appl. No.: 08/759,660

[22] Filed: Dec. 5, 1996

[51] Int. Cl.⁶ .................. B32B 5/16; B32B 7/00; G02B 3/00
[52] U.S. Cl. .................. 428/174; 359/321; 359/642; 428/333; 428/355 AC
[58] Field of Search .................. 428/332, 333, 428/174, 355 AC; 359/321, 642, 643

[56] References Cited

U.S. PATENT DOCUMENTS

| | | | |
|---|---|---|---|
| 3,519,462 | 7/1970 | Bristol et al. | 117/33.3 |
| 3,562,172 | 2/1971 | Ono et al. | 252/300 |
| 3,578,602 | 5/1971 | Ono et al. | 252/300 |
| 3,988,274 | 10/1976 | Masuhara et al. | 260/29.7 |
| 4,116,862 | 9/1978 | Wippler | 252/300 |
| 4,190,621 | 2/1980 | Greshes | 264/1 |
| 4,215,010 | 7/1980 | Hovey et al. | 252/300 |
| 4,268,134 | 5/1981 | Gulati et al. | |
| 4,286,957 | 9/1981 | Le Naour-Sene | 8/471 |
| 4,291,097 | 9/1981 | Kamada et al. | 428/412 |
| 4,342,668 | 8/1982 | Hovey et al. | 252/586 |
| 4,425,403 | 1/1984 | Taniguchi et al. | 428/331 |
| 4,544,572 | 10/1985 | Sandvig et al. | 427/44 |
| 4,556,605 | 12/1985 | Mogami et al. | 428/331 |
| 4,637,698 | 1/1987 | Kwak et al. | 351/163 |
| 4,693,962 | 9/1987 | Tamura et al. | 430/345 |
| 4,756,973 | 7/1988 | Sakagami et al. | 428/412 |
| 4,758,448 | 7/1988 | Sandvig et al. | 427/54.1 |
| 4,791,184 | 12/1988 | Nagai et al. | 526/323.2 |
| 4,792,224 | 12/1988 | Kwiatkowski et al. | 351/163 |
| 4,851,471 | 7/1989 | Maltman et al. | 524/719 |
| 4,882,438 | 11/1989 | Tanaka et al. | 548/407 |
| 4,909,963 | 3/1990 | Kwak et al. | 252/586 |
| 4,913,544 | 4/1990 | Rickwood et al. | 351/164 |
| 4,936,995 | 6/1990 | Kwiatkowski | 252/586 |
| 4,954,591 | 9/1990 | Belmares | 526/264 |
| 4,960,678 | 10/1990 | Tanaka et al. | 430/332 |
| 4,968,454 | 11/1990 | Crano et al. | 252/586 |
| 4,973,640 | 11/1990 | Matsuda et al. | 526/323.1 |
| 4,994,208 | 2/1991 | McBain et al. | 252/586 |
| 5,000,878 | 3/1991 | Chu | 252/857 |
| 5,021,196 | 6/1991 | Crano et al. | 252/586 |
| 5,106,998 | 4/1992 | Tanaka et al. | 549/331 |
| 5,110,881 | 5/1992 | McBain et al. | 525/455 |
| 5,130,058 | 7/1992 | Tanaka et al. | 252/586 |
| 5,147,585 | 9/1992 | Blum | 264/1.4 |
| 5,178,800 | 1/1993 | Blum | 264/1.4 |
| 5,180,524 | 1/1993 | Casilli et al. | 252/586 |
| 5,185,390 | 2/1993 | Fischer et al. | 524/43 |
| 5,219,497 | 6/1993 | Blum | 264/1.4 |
| 5,246,989 | 9/1993 | Iwamoto et al. | 524/89 |
| 5,316,702 | 5/1994 | Gupta et al. | 264/1.7 |
| 5,349,065 | 9/1994 | Tanaka et al. | 546/15 |
| 5,366,668 | 11/1994 | Cuthbertson et al. | 264/1.8 |
| 5,405,557 | 4/1995 | Kingsbury | 264/1.7 |
| 5,523,030 | 6/1996 | Kingsbury | 264/1.7 |
| 5,531,940 | 7/1996 | Gupta et al. | |

FOREIGN PATENT DOCUMENTS

| | | |
|---|---|---|
| 0 134 633 | 3/1985 | European Pat. Off. |
| 0 141 407 | 5/1985 | European Pat. Off. |
| 0 245 020 | 11/1987 | European Pat. Off. |
| 42 20 251 | 1/1993 | European Pat. Off. |
| 0 708 164 | 4/1996 | European Pat. Off. |
| 2 333 783 | 6/1974 | Germany . |
| WO 85/02619 | 6/1985 | WIPO . |
| WO93/06160 | 4/1993 | WIPO . |
| WO94/04952 | 3/1994 | WIPO . |
| WO94/23928 | 10/1994 | WIPO . |
| WO 95/15845 | 6/1996 | WIPO . |
| WO96/18921 | 6/1996 | WIPO . |

OTHER PUBLICATIONS

Abstract of JP 3002864, Toray Ind. Inc., Jan, 9, 1991.

*Primary Examiner*—H. Thi Le

[57] ABSTRACT

A resin is provided comprising a mixture of at least two polymerizable components, at least one photochromic additive, at least one additive and at least one polymerization initiator. The mixture of at least two polymerizable components is preferably selected from monofunctional, difunctional and multifunctional acrylates and methacrylates. The photochromic additive is preferably selected from spirooxazine additives and spiropyran additives. And the additive is preferably selected from antioxidants, radical scavengers and ultraviolet absorbers.

14 Claims, No Drawings

LENS OR SEMI-FINISHED BLANK COMPRISING PHOTOCHROMIC RESIN COMPOSITIONS

BACKGROUND OF THE INVENTION

Traditionally, plastic eyeglass lenses as well as plastic lenses designed for other applications have been fabricated by one of two ways: 1) casting the whole lens between two molds as a finished monolithic optic; and 2) casting a semi finished blank, then grinding it to the desired prescription. Both thermoplastics and thermosets may be used as optical materials. Thermoplastics are generally formed by injection molding, although compression and transfer molding techniques have also been used. Thermosets, such as resin formulations based on diethylene glycol bis allyl carbonate (DEG BAC) are formed by cast molding techniques. In all cases, what is obtained is a finished optic made of a single material. This optic may subsequently be coated to develop desired surface properties, such as enhanced scratch resistance, reduced optical reflectance, or enhanced impact resistance, mostly using conventional coating processes, such as dip coating, spin coating, or vacuum deposition. These coatings rarely exceed 25 microns in thickness.

Recently, methods of casting optical layers of a wide range of thicknesses on lenses have been disclosed, e.g., by Blum (U.S. Pat. No. 5,219,497). These methods utilize a substrate lens blank and a mold of specified curvature to polymerize a liquid resin on the surface of the lens substrate. The layer may be uniform in thickness, or may alter the surface geometry of the substrate in some specified and controlled manner. Layers of 1,000 microns or more at the upper end, and down to 25 microns in thickness may be deposited by this method. This method is applicable to both thermoplastic and thermoset lens substrates, and both thermoplastic and thermoset layers may be deposited through the use of a mold. A layered composite optic may be formed by this method.

The cast optical layers in thickness between 25 and 1000 microns or more may perform many optical functions. They may be added to minimize optical aberrations in the substrate lens blank, develop an achromatic optic or provide bifocal or multifocal optics through the development of refractive index gradients. The superstrate layers may also be provided to add a photochromic layer to the substrate lens blank. Indeed, the quality and range of applicability of plastic lenses is significantly enhanced by the development of composite optics, formed by adding one or more layers on a lens substrate.

Although the fabrication of composite lenses using a mold and a lens blank as described above is well established, the fabrication method requires a large inventory of molds and a separate fabrication facility in addition to the one used to cast the substrate blanks. It is therefore desirable to develop a fabrication process in which the development of the superstrate layers is integrated to the manufacture of the lens blanks themselves, and does not require additional handling of the blanks after they are formed. Previously disclosed methods of formation of photochromic lenses (U.S. Pat. No. 4,968,454 by Crano et al., U.S. Pat. No. 4,286,957 by Le Naour-Sene, U.S. Pat. No. 4,936,995 by Kwiatkowski, and U.S. Pat. No. 4,637,698 by Kwak, et al.) have included application of photochromic layers on lenses or lens blanks, but have not addressed the integration of the photochromic layer to the substrate, in order to arrive at a streamlined manufacturing process at a lower cost, or to achieve a superior optical quality as well as mechanical and thermal properties by developing an interphase between the lens substrate and the superstrate layer.

SUMMARY OF THE INVENTION

According to an embodiment of the invention, a resin is provided comprising: a mixture of at least two polymerizable components, at least one photochromic additive, at least one additive and at least one polymerization initiator. The mixture of at least two polymerizable components is preferably selected from monofunctional, difunctional and multifunctional acrylates and methacrylates. The photochromic additive is preferably selected from spirooxazine additives and spiropyran additives. The additive is preferably selected from antioxidants, radical scavengers and ultraviolet absorbers.

The resin preferably comprises: 0 to about 70 wt % monofunctional component, about 10 to about 50 wt % difunctional component, 0 to about 20 wt % multifunctional component, about 0.02 to about 0.2 wt % spirooxazine additives, about 0.05 to about 0.3 wt % spiropyran additives, about 0.1 to about 2 wt % additive, and about 0.125 to about 2.5 wt % polymerization initiator.

The resin preferably forms a material having a glass transition temperature ranging from about 20° C. to about 90° C., more preferably about 30° C. to about 85° C., even more preferably about 30 to about 60° C., or a cross link density ranging from about 0.5 M/L to about 3.0 M/L, more preferably about 1 to about 2 M/L, upon polymerization. The resin preferably has a viscosity ranging from about 25 to about 150 cps at 25° C.

The difunctional component can be selected from hydrophilic acrylates and methacrylates, preferably a polyethylene glycol diacrylate. The monofunctional component can be selected from hydrophobic acrylates and methacrylates, preferably having a long-chain methylene moiety. The monofunctional component preferably has a glass transition temperature ranging from about 50 to about 120° C. upon polymerization.

The polymerization initiator can comprise a thermal polymerization initiator or a photochemical polymerization initiator.

The photochromic additive is preferably at least one of a red chromene dye, a purple spriooxazine dye, a yellow chromene dye and a green spriooxazine dye.

The resin can be provided in polymerized form as an optical layer over a lens or semifinished blank, with the layer having a thickness ranging from about 25 to about 1000 μm.

The lens or semifinished blank can comprise a thermoset material, in which case the resin and the thermoset material can be formulated with matched polymerizable components such that interfacial linkages are formed between the matched polymerizable components. Moreover, an interpenetrating layer can be formed at an interface between the resin and the thermoset material. The lens or semifinished blank can also be a thermoplastic material.

The resin can be provided in a layer over a mold, with the layer having a thickness ranging from about 25 to about 1000 μm, in which case, the layer can be unpolymerized, partially polymerized, or partially polymerized and gelled.

According to another embodiment of the invention, a method is provided comprising: applying a layer of the above resin to a mold to form a mold coated with a precoat resin; contacting the precoat resin with a casting resin; polymerizing the precoat resin; and polymerizing the casting resin. The layer can be applied by dipping, spraying, spincoating, or stereo lithography. Either resin can be unpolymerized or at least partially polymerized before contacting the other.

DETAILED DESCRIPTION OF THE INVENTION

This invention describes polymerizable resin formulations which may be used to form a polymeric layer on the molding surface of a mold which is then used to fabricate a plastic lens or a lens blank, transferring the preformed layer on the outer surface of the lens formed by this process. The use of precoated molds to cast a plastic lens is known in the art. Sandvig, et al (U.S. Pat. No. 4,758,448) disclosed the formation of plastic lenses with enhanced scratch resistance by using molds coated with a mixture of monomeric and oligomeric multifunctional acrylates and methacrylates. The resin formulations of this invention are specifically directed towards the development of photochromic layers which range in thickness between 25 microns to 1000 microns, and can provide uniform or gradient photochromic properties across the lens surface. The layers formed from these have glass transition temperatures in the range of 20 C. to 90 C., and preferably in the range of 30 C. to 85 C., and cross link density in the range of 0.5 M/L to 3.0 M/L, all preferred to ensure desirable switching dynamics, tint or color in the activated and the unactivated states, as well as the dynamic range (the change in optical transmittance between the unactivated and the activated states) of the photochromic additives as a function of the ambient temperature.

The resin formulations ("precoat resin") may be applied to the mold surface by dipping, spraying, spin coating, or stereo lithography. They may be left as an unpolymerized liquid coat, a pregel, partially polymerized layer, or a gelled partially polymerized layer. The molds may be coated with the resin layer and stocked for future use, or may be precoated immediately prior to use for casting lenses. The substrate lens may be cast from any resin formulated to undergo an addition or a condensation polymerization process.

If the resin used to cast the substrate lens or lens blank ("Casting Resin") undergoes a chemical reaction with the photochromic additive present in the precoat layer during the polymerization process, it becomes necessary to avoid diffusive mixing of the casting resin in the unpolymerized state with the photochromic additive. The photochromic additive may be isolated from the casting resin by carrying forward the polymerization and cross linking of the precoat layer bearing the photochromic additive to a point such that the diffusion of additive molecules from the precoat layer into the casting resin, or the diffusion of the casting resin into the precoat layer is held to a minimum. It is important to note that while the rate of interdiffusion of the components of the precoat and the casting resin may be slowed down, it is still necessary to maintain good compatibility between the two in order to develop a strong adhesive bond between them. It is possible to adopt one or more of the following strategies to integrate the precoating layer to the substrate.

1) During the casting process, the precoat layer deposited on the surface of the mold may retain its integrity and form an adhesive bond to the substrate; in this case, the precoating layer is at least partially cured before filling the mold assembly with the resin formulation for casting of the substrate lens. The surface energy of the precoated layer is carefully adjusted to be compatible with the substrate. It is also desirable to include matched polymerizable components in the precoated layer and the substrate lens so that these components can form interfacial linkages, such as hydrogen bonds, -Si-O-X- linkages, when X is Si or C, or other linkages, such as amides or esters.

2) Polymerizable components of the resin forming the lens substrate or the precoat layer may undergo diffusion across the substrate-layer interface and undergo polymerization during the process forming the substrate lens. An interpenetrating layer (IPN) is thus formed, forming a discrete interphase between the substrate and the precoat layer. The advantage of forming such a layer is that interfacial light scattering is minimized, adhesive strength of the interface is enhanced, and in many cases, the impact properties, especially in response to normal forces, are improved.

3) The coating on the mold may be left unpolymerized before casting the substrate lens. In this case, it is necessary to use relatively viscous polymerizable components, in order to enable the precoat layer to maintain its integrity and the specified thickness profile across the surface of the mold during the handling and resin filling steps preceding the curing of the substrate lens. The curing process may involve application of heat, light or both. For example, it is possible to utilize high viscosity multifunctional oligomers premixed with a photoinitiator to form the precoat layer, and a low viscosity thermally activated polymerizable formulation to form the substrate lens. The curing process utilizes both heat and light, which is turned on at a specified temperature. The precoated layer reaches a certain viscosity and diffusion coefficient at the point of time when the photopolymerization is initiated. In this manner, interdiffusion between the two formulations may be carefully regulated to form the optimum interfacial gradient in composition and cross link density of the superstrate layer.

4) The precoat layer on the mold is partially polymerized to consume all initiator molecules and a certain portion of available polymerizable groups, and its composition is matched to form strong adhesion to the substrate lens, following approaches outlined in (1). The substrate lens is not cast in-situ, but added in the form of a lens blank. A specified volume of a polymerizable resin is added to the mold to form an adhesive layer between the precoat layer and the substrate lens blank. The resulting lens is a three layer composite, consisting of a substrate coated with two optical layers. This lens may be further hard coated to provide an outer surface which is hard and scratch resistant.

In all cases, the polymerization of the precoat layer on the mold as well as the substrate lens itself may be activated by heat, light or a combination of both. To this end, a combination of thermal and/or photochemical polymerization initiators may be employed in either or both formulations. Use of a combination of thermal and photochemical photoinitiators provides additional control of the rates of initiation of polymerization in precoat layer and the substrate lens, and allows different rates of polymerization initiation to be sustained in these two zones at the same time.

The molds may be made of glass, metal or plastic materials. Plastic molds may be reusable, or disposable, designed for a single or limited use. Metal molds may be formed from a solid piece of steel or other machinable metal, or may be made of glass coated with a metallic layer, which may be transparent to actinic radiation. For example, indium tin oxide (ITO) is metallic, yet transmits visible radiation which may be used to trigger polymerization in the substrate lens or the precoat layer.

The formulation of the precoat resin preferably contains a mixture of mono and multifunctional acrylates and methacrylates, polymerization initiators, antioxidants or radical scavengers, and photochromic additives. Cross linking resin formulations for fabrication of lenses and lens blanks have been disclosed by Toh (U.S. Pat. No. 4,912, 185), and by Gupta, et al (U.S. Pat. No. 5,470,892). The resin formulations developed in this invention are specifically targeted to yield resins of a certain range in cross link density, glass transition temperature, and viscosity (25–150 cps at 25 C.). The use of hindered amines and excited state quenchers to enhance weathering characteristics of photochromic compositions have been disclosed by Chu (U.S. Pat. No. 4,720,356). The photochromic additives may be selected from a family of spirooxazines, such as spiro-(indolino)-benzoxazines, spiro(indolino)-naphthoxazines, spiro(indolino) pyridobenzoxazines, etc., ("spirooxazines"), or a family of spiropyrans ("chromenes"). Photochromic additives have been disclosed in numerous US and overseas patents, for example, Guglielmetti, et al U.S. Pat. No. 5,139,707, and references therein. Photochromic additives are available commercially, and were obtained from James Robinson Limited, Huddersfield, UK, or Great Lakes Corporation, Minneapolis. Table 3 shows a typical combination of photochromic additives obtained from James Robinson Ltd.

The formulation of the casting resin may include acrylates, methacrylates, allylics, and vinyl compounds. Generally one or more bi or multifunctional components are used in the formulation in order to form a lens body which is highly cross linked. The formulation may include ultraviolet stabilizers, antioxidants, radical scavengers, color neutralizing agents, such as bluing compounds, as well as one or more photoinitiators or thermal polymerization initiators. Alternatively, the main components of this formulation may consist of monomers or oligomers capable of undergoing condensation polymerization, e.g., multifunctional epoxides, acid anhydrides, reacted with amine or hydroxide derivatives.

EXAMPLE 1

Starting with a typical formulation of isobornyl methacrylate (40%), neopentyl glycol diacrylate (41%), polymethylene glycol diacrylate (400) (15%), 1-hydroxy-cyclohexyl-phenyl ketone, bis-2,6-dimethoxybenzoyl-2,4,4-trimethylpentyl phosphine oxide (2%), and a hindered amine oxide (bis-2,2,6,6-tetramethyl-4-piperidyl-sebacate) (1%) as radical scavenger, a combination of four photochromic additives were added to develop a blue grey color upon activation (Table 3). This formulation was placed on the concave surface of a glass mold incorporating a progressive add power zone of 2.00 D, and a second mold of matching curvature (base curve) was placed on the resin pool, spreading it out into a thin layer. The spacing of the liquid layer was maintained at 200 microns at the distance portion, being thicker at the add power zone. The liquid resin layer was partially polymerized by exposing it to radiation in the wavelength range 350–700 nm for 20 minutes. The second mold was removed, and the first mold with the precoat layer was used to fabricate a semi finished progressive addition lens blank, as follows: The precoated mold was used to form a gasket assembly using a back mold and a gasket suitable for forming a semi finished lens blank. A Casting resin was injected into the gasket assembly, consisting of bis allyl diethylene glycol carbonate (96.2%), diisopropyl percarbonate, a thermal polymerization catalyst, (3.5%), and 5-methyl 2-hydroxyphenyl-2H-benzotriazole, a ultraviolet radiation absorber (0.3%). The glass transition temperature of the precoated layer on the final semi finished lens blank was measured to be 85 C. Table 1 shows the experimental results.

TABLE 1

Experimental Details for the Precoat Layer

| EXPT NO | IBMA | NGDA | PGDA | LA | TMPTA 15 | TMPTA 9 | PEMA | BADA | 184 | BAPO | 765 |
|---|---|---|---|---|---|---|---|---|---|---|---|
| 1 | 61 | 30 | 8 | 0 | 0 | 0 | 0 | 0 | 0.75 | 0.25 | 1 |
| 2 | 57 | 27 | 15 | 0 | 0 | 0 | 0 | 0 | 0.75 | 0.25 | 1 |
| 3 | 61 | 30 | 0 | 8 | 0 | 0 | 0 | 0 | 0.75 | 0.25 | 1 |
| 4 | 20 | 28 | 0 | 0 | 0 | 0 | 50 | 0 | 2 | 0 | 1 |
| 5 | 20 | 0 | 0 | 0 | 0 | 28 | 50 | 0 | 2 | 0 | 1 |
| 6 | 20 | 0 | 0 | 0 | 28 | 0 | 50 | 0 | 2 | 0 | 1 |
| 7 | 0 | 0 | 12 | 0 | 0 | 0 | 60 | 25 | 2 | 0 | 1 |
| 8 | 0 | 25 | 12 | 0 | 0 | 0 | 60 | 0 | 2 | 0 | 1 |
| 9 | 0 | 50 | 17 | 0 | 0 | 0 | 30 | 0 | 2 | 0 | 1 |

Ethoxylated$_9$ Trimethylolpropane Triacrylate (TMPTA9)
Ethoxylated$_{15}$ Trimethylolpropane Triacylate(TMPTA15)
2-Phenoxyethyl Methacrylate (PEMA)
Polyethylene Glycol (400) Diacrylate (PGDA)
Neopentyl Glycol Diacrylate (NGDA)
Isobornyl Methacrylate (IBMA)
Lauryl Acrylate (LA)
Ethoxylated bisphenol A Diacrylate (BADA)
1-Hydroxy-Cyclohexyl-Phenyl Ketone (184)
Bis-2,6-Dimethoxybenzoyl-2,4,4-Trimethylpentyl Phosphine Oxide (BAPO)
Hindered Amine Oxide (Bis-2,2,6,6-Tetramethyl-4-Piperidyl-Sebacate) (765)

EXAMPLE 2

The composition of the precoat resin was as in example 1, except that the proportion of the hydrophilic polymethylene glycol diacrylate was raised to 15%. The precoat resin was filtered by passing it through a 0.2 micron stainless steel filter, then degassed by passing argon gas through the filtered resin for 30 minutes. The resin was applied to the concave surface of a single vision glass mold by mounting the mold on a chuck, then spinning it at the rate of 200 rpm as the resin was added to the surface of the mold. The mold was irradiated with a 10 second pulse of UV light while being rotated after the addition of the resin was stopped. Additional liquid resin may be subsequently added to the surface of the mold, and gelled by a pulse of UV light, thus building up the thickness of the precoat layer to specification. In this case, five resin applications produced an overall thickness of 200 microns. The precoating step was performed in a nitrogen atmosphere in order to shorten the duration of the UV pulse needed to bring about gelation. The glass transition temperature of the precoat layer was lowered, increasing the switching rate, and the cross link density was decreased from 0.75M/L to 0.35 M/L. Table 2 provides the experimental results. The precoated mold was used to form a gasket assembly needed to cast a finished single vision lens (−2.00 D sph, −2.00 D astig). A casting resin consisting of α-Methyl Styrene (40%), ethoxylated bisphenol A Diacrylate (40%), Diethylene Glycol Diallyl Carbonate (19%), and azo-isobutyronitrile, a thermal polymerization initiator (1.0%). The lens was cured by placing the gasket assembly in a convection oven, and subjecting it to a thermal ramp starting from room temperature to 180 F. over a twenty (20) hour period. The deactivated color of the finished lens was somewhat darker, indicative of the interaction of certain spiroindolizine type photochromic additives to interact with an increasingly polar medium to form a ground state population richer in the ring opened form, which is colored.

EXAMPLE 3

As in example 1, except that the hydrophilic diacrylate was replaced by isooctyl acrylate, a hydrophobic monomer with a low glass transition temperature in the precoat resin formulation. A single vision mold was precoated, in order to ultimately form a semifinished single vision blank with a photochromatic layer on the convex surface. The precoat layer was formed by using a second glass mold, the precoat resin being used to fill the space between the two molds. The precoated mold was used to set up a gasket assembly needed to form a semi finished single vision blank. The indoor color of the semi finished blank was further reduced relative to example 2, although the switching speed remained unchanged, indicating that reduction of polarity of the photochromic medium serves to reduce color of the lens in the deactivated state. A second cured resin layer may be added to the semi finished single vision blank to form a semi finished FT-28 blank, following the method described in Blum (U.S. Pat. No. 5,219,497).

Table 2 shows the properties of the switching and other optical properties of the photochromic lenses made using the formulations listed in Table 1.

The Precoat Resin was formulated with a mixture of photochromic dyes such that the tint in the activated state which develops upon outdoor exposure is blue grey. The following dyes were used in various formulations: Reversacol Berry Red, Reversacol Palatinate Purple, Reversacol Corn Yellow, and Reversacol Aqua Green. Table 3 shows the composition of the dye mixture used in examples 1–3, and their chemical nature.

TABLE 2

Indoor color, optical clarity, and darkening characteristics of photochromic lenses

| EXPT NO | INDOOR COLOR | GLASS TRANSITION TEMP in °C. | INDOOR OPT TRANSMISSION, % | OPT TRANS SOLAR SIM[1] |
|---|---|---|---|---|
| 1 | GR/Y | 84 | 84 | 42 |
| 2 | GR/Y | 81 | 84 | 42 |
| 3 | GR/Y | 73 | 85 | 44 |
| 4 | GREEN | | | |
| 5 | GR/Y | | | |
| 6 | YELLOW | | | |

[1] Activation measurements performed using a Solar Simulator set at AM1.0 at 85F, at 20 minutes.

TABLE 3

Composition of photochromic dyes used in Precoat Resins

| DYE | CHEMICAL FAMILY | WEIGHT PERCENT PREFERRED RANGE | |
|---|---|---|---|
| REVERSACOL BERRY RED | CHROMENE | 0.090% | (0.05–0.1) |
| REVERSACOL PALATINATE PURPLE | SPIROOXAZINE | 0.15% | (0.10–0.20) |
| REVERSACOL CORN YELLOW | CHROMENE | 0.085% | (0.075–0.150) |
| REVERSACOL AQUA GREEN | SPIROOXAZINE | 0.060% | (0.04–0.10) |

What is claimed is:

1. A lens or semifinished blank comprising:
a lens or semifinished blank and a resin layer on at least one surface of the lens or semifinished blank, said layer having a thickness ranging from about 25 to about 1000 μm, the resin layer comprising a resin having a viscosity of about 25 to about 150 cps at 25° C. and that is a mixture of at least two polymerizable components selected from monofunctional, difunctional and multifunctional acrylates and methacrylates, such that the monofunctional component comprises 0 to about 70 wt percent of the resin, the difunctional component comprises about 10 to about 50 wt percent of the resin and the multifunctional component comprises 0 to about 20 wt percent of the resin; at least one photochromic additive selected from spiroxazine and spiropyran additives; at least one additive selected from antioxidants, radical scavengers and ultraviolet absorbers; and at least one polymerization initiator
wherein the resin forms a material having a glass transition temperature of about 20 to about 90° C. or a crosslink density of about 0.5 M/L to about 3.0 M/L upon polymerization.

2. The lens or semifinished blank of claim 1 wherein the difunctional component is selected from hydrophilic acrylates and methacrylates.

3. The resin of claim 2 wherein the difunctional component is a polyethylene glycol diacrylate.

4. The lens or semifinished blank of claim 1 wherein the monofunctional component is selected from hydrophobic acrylates and methacrylates.

5. The resin of claim 4 wherein the monofunctional component is an acrylate or methacrylate having a long-chain methylene moiety.

6. The resin of claim 1, in which said lens or semifinished blank comprises a thermoset material.

7. The resin of claim 1, in which said lens or semifinished blank comprises a thermoplastic material.

8. A lens or semifinished blank comprising:
a lens or semifinished blank and a resin layer on at least one surface of the lens or semifinished blank said layer having a thickness ranging from about 25 to about 1000 μm, the resin layer comprising a resin having a viscosity of about 25 to about 150 cps at 25° C. and that is a mixture of 0 to about 70 wt percent of a hydrophobic acrylate or methacrylate, about 10 to about 50 wt percent of a polyethylene glycol diacrylate and 0 to about 20 wt percent of a multifunctional component; at least one photochromic additive selected from spriox-azine and spiropyran additives; at least one additive selected from antioxidants, radical scavengers and ultraviolet absorbers; and at least one polymerization initiator wherein the resin forms a material having a glass transition temperature of about 20 to about 90° C. or a crosslink density of about 0.5 M/L, to about 3.0 M/L upon polymerization.

9. The lens or semifinished blank of claim 1 or 8, wherein said resin layer is unpolymerized.

10. The lens or semifinished blank of claim 1 or 8, wherein said resin layer is partially polymerized.

11. The lens or semifinished blank of claim 1 or 8, wherein said resin layer is partially polymerized and gelled.

12. The lens or semifinished blank of claim 1 or 8 wherein the photochronic additive is at least one of a red chromene dye, a purple spirooxazine dye, a yellow chromene dye, and a green spirooxazine dye.

13. The lens or semifinished blank of claim 1 or 8 wherein the resin forms a material having a glass transition temperature ranging from about 30 to about 60° C. upon polymerization.

14. The lens or semifinished blank of claim 1 or 8, wherein the resin forms a material having a cross link density ranging from about 1 to about 2 M/L upon polymerization.

* * * * *